(12) United States Patent
Xie et al.

(10) Patent No.: US 12,430,143 B2
(45) Date of Patent: Sep. 30, 2025

(54) SOFTWARE CONFIGURATION METHOD, AND ELECTRONIC DEVICE

(71) Applicant: Beijing Volcano Engine Technology Co., Ltd., Beijing (CN)

(72) Inventors: Fei Xie, Beijing (CN); Jiafu Pang, Beijing (CN); Xinwei Chen, Beijing (CN)

(73) Assignee: Beijing Volcano Engine Technology Co., Ltd., Beijing (CN)

(*) Notice: Subject to any disclaimer, the term of this patent is extended or adjusted under 35 U.S.C. 154(b) by 0 days.

(21) Appl. No.: 18/958,193

(22) Filed: Nov. 25, 2024

(65) Prior Publication Data
US 2025/0190228 A1    Jun. 12, 2025

(30) Foreign Application Priority Data
Dec. 6, 2023 (CN) .......................... 202311666919.X (51) Int. Cl.
  *G06F 9/44*    (2018.01)
  *G06F 9/445*   (2018.01)
(52) U.S. Cl.
  CPC .............................. *G06F 9/44505* (2013.01)
(58) Field of Classification Search
  CPC ..................................... G06F 1/32; G06F 9/44
  See application file for complete search history.

(56) References Cited

U.S. PATENT DOCUMENTS

2014/0325045 A1* 10/2014 Pechersky ........... H04L 63/0407
                                                    709/223
2024/0221492 A1*  7/2024 Emerson ................ G08B 29/18

FOREIGN PATENT DOCUMENTS

| CN | 1968166 A   | 5/2007  |
| CN | 115297090 A | 11/2022 |
| CN | 115967955 A | 4/2023  |

* cited by examiner

*Primary Examiner* — Keshab R Pandey
(74) *Attorney, Agent, or Firm* — Alleman Hall & Tuttle LLP (57) ABSTRACT

Embodiments of the present application disclose a software configuration method and an electronic device. The method includes: receiving a software configuration acquisition request, in which the software configuration acquisition request includes a network region identifier, the network region identifier indicates a network region to which a client from which the software configuration acquisition request originates belongs, and the software configuration acquisition request is used to request configuration information of a function that is allowed to be used; searching for a function identifier corresponding to the network region identifier included in the software configuration acquisition request as a first function identifier; and feeding back configuration information of a function indicated by the first function identifier, so that the client uses the configuration information to implement the function indicated by the first function identifier.

18 Claims, 9 Drawing Sheets

100

101 Receiving a software configuration acquisition request.

102 Searching for a function identifier corresponding to the network region identifier included in the software configuration acquisition request as a first function identifier 103 Feeding back configuration information of a function indicated by the first function identifier, so that the client uses the configuration information to implement the function indicated by the first function identifier

SOFTWARE CONFIGURATION METHOD, AND ELECTRONIC DEVICE

CROSS-REFERENCE TO RELATED APPLICATION(S)

The present application claims priority of the Chinese Patent Application No. 202311666919.X, filed on Dec. 6, 2023, the disclosure of which is incorporated herein by reference in its entirety as part of the present application.

TECHNICAL FIELD

Embodiments of the present disclosure relate to the field of computer technologies, and in particular, to a software configuration method and an electronic device.

BACKGROUND

In software used by an enterprise, when the software is used in different network regions (for example, an IT production network, an office network, and the Internet) of the enterprise, the software generally needs to present different functions for security considerations. For example, some function modules can be used only when the IT production network is enabled, and cannot be used when the other network regions are enabled. In addition, for a web application, for the requirement of access control in a plurality of network regions, different network regions may use different domain names.

At present, to meet the above requirements, a plurality of services are deployed, and different network access respective corresponding services, to implement network access and permission control. However, this solution has high cost for deployment and operation and maintenance, and a relatively complex system architecture.

SUMMARY

The present disclosure section is provided to give a brief introduction to concepts, which will be described in detail in the section of Detailed Description of Embodiments. The present disclosure section is not intended to identify key features or necessary features of the claimed technical solutions, nor is it intended to be used to limit the scope of the claimed technical solutions.

An embodiment of the present disclosure provides a software configuration method, comprising: receiving a software configuration acquisition request, in which the software configuration acquisition request includes a network region identifier, the network region identifier indicates a network region to which a client from which the software configuration acquisition request originates belongs, and the software configuration acquisition request is used to request configuration information of a function that is allowed to be used; searching for a function identifier corresponding to the network region identifier included in the software configuration acquisition request as a first function identifier; and feeding back configuration information of a function indicated by the first function identifier, so that the client uses the configuration information to implement the function indicated by the first function identifier.

An embodiment of the present disclosure provides a software configuration apparatus, which includes a receiving unit, a searching unit and a feedback unit. The receiving unit is configured to receive a software configuration acquisition request, in which the software configuration acquisition request includes a network region identifier, the network region identifier indicates a network region to which a client from which the software configuration acquisition request originates belongs, and the software configuration acquisition request is used to request configuration information of a function that is allowed to be used. The searching unit is configured to search for a function identifier corresponding to the network region identifier included in the software configuration acquisition request as a first function identifier. The feedback unit is configured to feed back configuration information of a function indicated by the first function identifier, so that the client uses the configuration information to implement the function indicated by the first function identifier.

An embodiment of the present disclosure provides an electronic device, which includes one or more processors and a memory. The memory is configured to store one or more programs, and when the one or more programs are executed by the one or more processors, the one or more processors is caused to implement the software configuration method.

An embodiment of the present disclosure provides a computer-readable medium that has a computer program stored thereon. When the computer program is executed by a processor, the processor is caused to implement the steps of the software configuration method.

BRIEF DESCRIPTION OF DRAWINGS

The above and other features, advantages, and aspects of the embodiments of the present disclosure become more apparent with reference to the following specific implementations and in conjunction with the accompanying drawings. Throughout the drawings, the same or similar reference numerals denote the same or similar elements. It should be understood that the accompanying drawings are schematic and that parts and elements are not necessarily drawn to scale.

DETAILED DESCRIPTION

Embodiments of the present disclosure will be described in more detail below with reference to the accompanying drawings. Although some embodiments of the present disclosure are shown in the drawings, it should be understood that the present disclosure may be implemented in various forms and should not be construed as being limited to the embodiments set forth herein. Rather, these embodiments are provided for a more thorough and complete understanding of the present disclosure. It should be understood that the drawings and embodiments of the present disclosure are only for exemplary purposes, and are not intended to limit the scope of protection of the present disclosure.

It should be understood that the various steps described in the method implementations of the present disclosure may be performed in different orders, and/or performed in parallel. In addition, additional steps may be included and/or the execution of the illustrated steps may be omitted in the method implementations. The scope of the present disclosure is not limited in this respect.

The term "include/comprise" used herein and the variations thereof are an open-ended inclusion, namely, "include/comprise but not limited to". The term "based on" is "at least partially based on". The term "an embodiment" means "at least one embodiment". The term "another embodiment" means "at least one another embodiment". The term "some embodiments" means "at least some embodiments". Related definitions of the other terms will be given in the description below.

It should be noted that concepts such as "first" and "second" mentioned in the present disclosure are only used to distinguish different apparatuses, modules, or units, and are not used to limit the sequence of functions performed by these apparatuses, modules, or units or interdependence.

It should be noted that the modifiers "one" and "a plurality of" mentioned in the present disclosure are illustrative and not restrictive, and those skilled in the art should understand that unless the context clearly indicates otherwise, it should be understood as "one or more".

The names of messages or information exchanged between a plurality of apparatuses in the implementation of the present disclosure are only used for illustrative purposes, and are not used to limit the scope of these messages or information.

Figure 1:
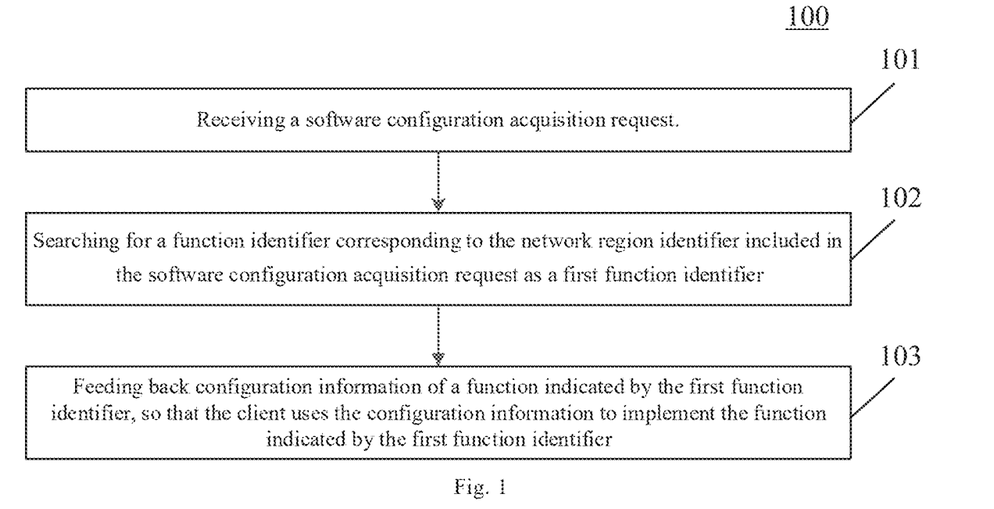
FIG. 1 is a flowchart of an embodiment of a software configuration method according to the present disclosure.

With reference to FIG. 1, which shows a process 100 of an embodiment of a software configuration method according to the present disclosure, the software configuration method includes the following steps.

Step 101: receiving a software configuration acquisition request.

In this embodiment, an execution subject of the software configuration method may receive a software configuration acquisition request. The execution subject is usually a server, and the software configuration acquisition request usually originates from a client. That is, when the client uses the software, the client sends the software configuration acquisition request to a software server. The software configuration acquisition request is usually used to request configuration information of a function that is allowed to be used.

Here, the software configuration acquisition request may include a network region identifier. The network region identifier usually indicates a network region to which the client from which the software configuration acquisition request originates belongs, that is, the network region where the execution subject is currently located. The network region identifier is used to identify a source of a network request in a subsequent service and perform corresponding function control. The network region identifier may include two parts, i.e., a name and a value. The name part cannot be repeated with the name of an HTTP (Hypertext Transfer Protocol) header that has been occupied in the system, and the value part is used to mark each network region, and different network region identifiers cannot be repeated.

For example, a network region identifier of an office network may be: x-zone-id: oa, where x-zone-id is the header name and oa is the value.

It should be noted that the client may send the software configuration acquisition request to the software server when the software is started.

Step 102: searching for a function identifier corresponding to the network region identifier included in the software configuration acquisition request as a first function identifier.

In this embodiment, the execution subject may search for the function identifier corresponding to the network region identifier included in the software configuration acquisition request as the first function identifier. The execution subject usually includes a correspondence relationship table of a correspondence relationship between the network region identifier and the function identifier. The execution subject may search for, in the correspondence relationship table, the function identifier corresponding to the network region identifier included in the software configuration acquisition request.

For example, a function identifier corresponding to an office network x-zone-id: oa may include a function 1 and a function 2, and a function identifier corresponding to the Internet x-zone-id: public may include a function 2 and a function 3.

Here, a multi-network region configuration module may be added to the software, and the module is configured to configure network regions supported by the current software, identifiers of the network regions, and function presentation of the network regions. The configuration module may be a configuration file without an interface.

Step 103: feeding back configuration information of a function indicated by the first function identifier, so that the client uses the configuration information to implement the function indicated by the first function identifier.

In this embodiment, the execution subject may feed back configuration information of a function indicated by the first function identifier, so that the client that originates the software configuration acquisition request uses the configuration information to implement the function, thereby enabling different functions to be presented when the software is used in different network regions. Here, different functions include but are not limited to a difference in a number of function modules, a difference in function points, and a difference in data presentation.

For example, when the client is currently in the office network, and the configuration information fed back by the server to the client includes configuration information of the function 1 and the function 2, then the client may implement the function 1 and the function 2 during a process of the user using the software.

The method provided in the above embodiment of the present disclosure is implemented by means of: receiving a software configuration acquisition request including a network region identifier; then searching for a function identifier corresponding to the network region identifier included in the software configuration acquisition request as a first function identifier; and then feeding back configuration information of a function indicated by the first function identifier, so that the client that originates the software configuration acquisition request uses the configuration information to implement the function. In this way, a network region mark is added to the software configuration acquisition request, so that the server can identify the network region to which the client from which the software configuration acquisition request originates belongs, thereby enabling different functions to be presented when the software is used in different network regions. In addition, for a web application, the capability of supporting multi-domain name access by the same system is also supported, and domain names of different network regions do not need to be unique.

In some optional implementations, in a process of sending the software configuration acquisition request to a server cluster that provides a service for the software, the software configuration acquisition request passes through a gateway device, and the gateway device adds a network region identifier to the software configuration acquisition request sent by the client.

Figure 2:
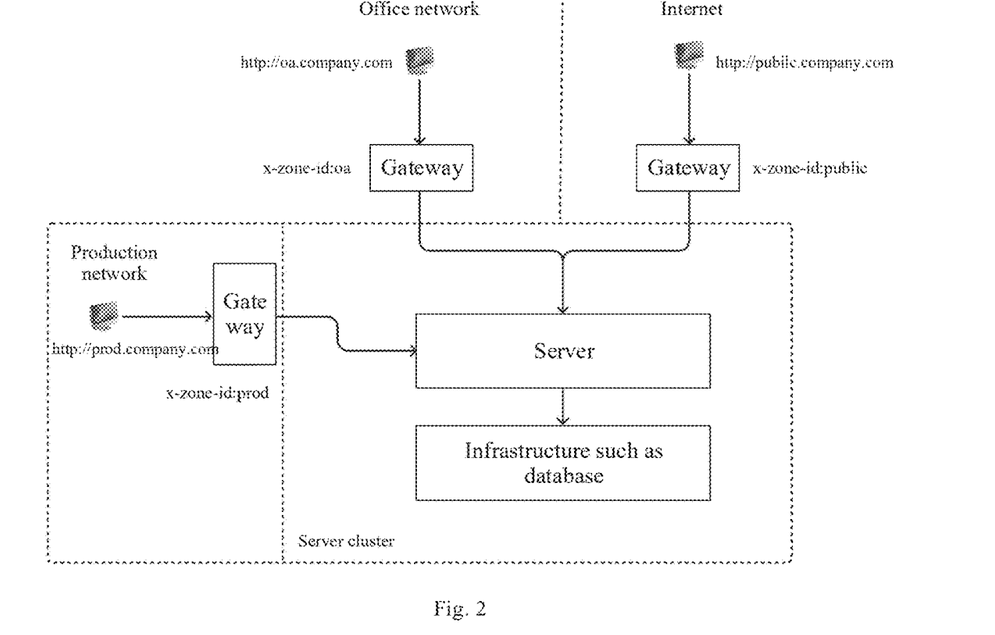
FIG. 2 is a schematic diagram of adding a network region mark to a request at an entry gateway in the software configuration method according to the present disclosure.

FIG. 2 is a schematic diagram of adding a network region mark to a request at an entry gateway in the software configuration method according to this embodiment. In FIG. 2, there are three different network regions, specifically, a production network, an office network and the Internet. A domain name of the production network is prod.company.com, a domain name of the office network is oa.company.com, and a domain name of the Internet is public.company.com. When a request in each network region passes through the gateway, the gateway adds a network region identifier to the request. Here, a network identifier added by the gateway for the production network is x-zone-id: prod, a network identifier added by the gateway for the office network is x-zone-id: oa, and a network identifier added by the gateway for the Internet is x-zone-id: public. In this way, a network region identifier may be added to all HTTP request headers given to the software when a request from each network region passes through an entry gateway of a service cluster where the software is located, the network region identifier is used to identify a source of the request in a subsequent service and perform corresponding function control.

Figure 3:
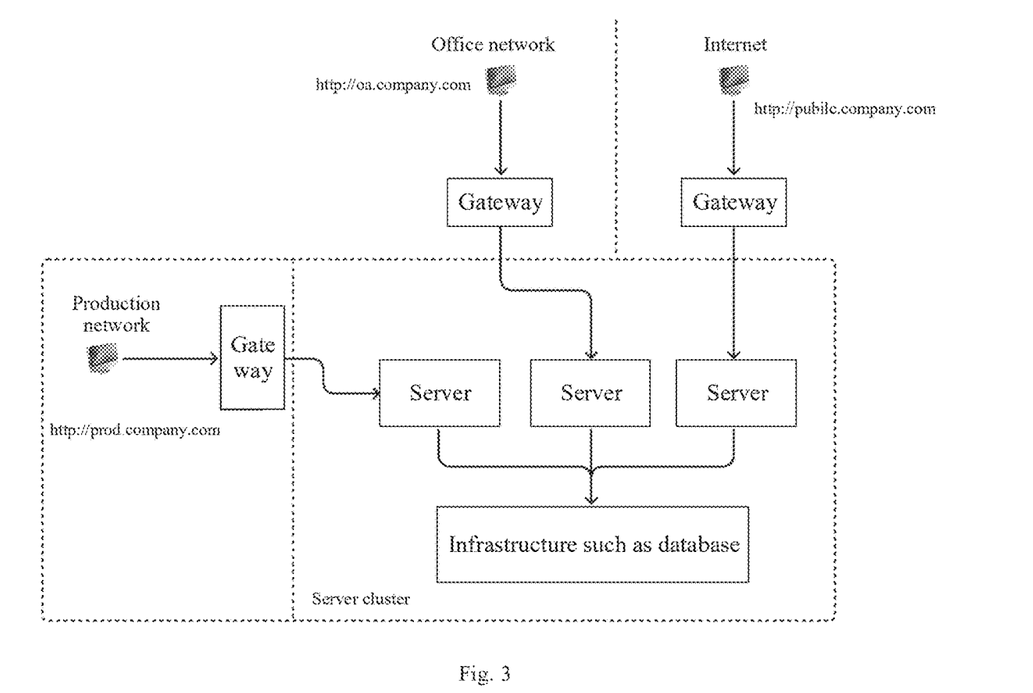
FIG. 3 is a schematic diagram of different network accesses being connected to respective corresponding services.

As shown in FIG. 3, FIG. 3 is a schematic diagram of different network accesses being connected to respective corresponding services. In FIG. 3, there are three different network regions, specifically, a production network, an office network and the Internet. A domain name of the production network is prod.company.com, a domain name of the office network is oa.company.com, and a domain name of the Internet is public.company.com. In some cases, a service cluster that provides a service for the software deploys a plurality of servers, and different networks access respective corresponding servers to implement access according to the network and permission control. However, the defect of this solution is that the cost for deployment and operation and maintenance is high, and the system architecture is relatively complex.

Figure 4:
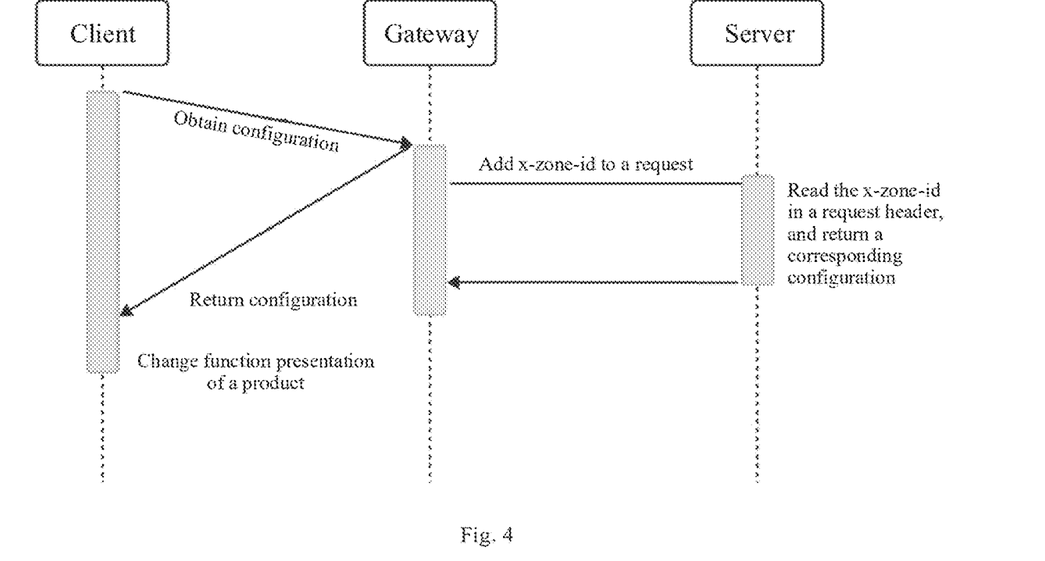
FIG. 4 is a sequence diagram of an embodiment of the software configuration method according to the present disclosure.

With reference to FIG. 4, FIG. 4 is a sequence diagram of an embodiment of the software configuration method according to this embodiment. In FIG. 4, the client sends a software configuration acquisition request to a server during a software startup process. When the software configuration acquisition request passes through a gateway, a network region identifier x-zone-id of a current network region is added to the software configuration acquisition request. After receiving the software configuration acquisition request, the server reads the x-zone-id in a software configuration acquisition request header, and returns a corresponding configuration to the client. After receiving the configuration, the client changes the function presentation of a product according to the configuration.

Figure 5:
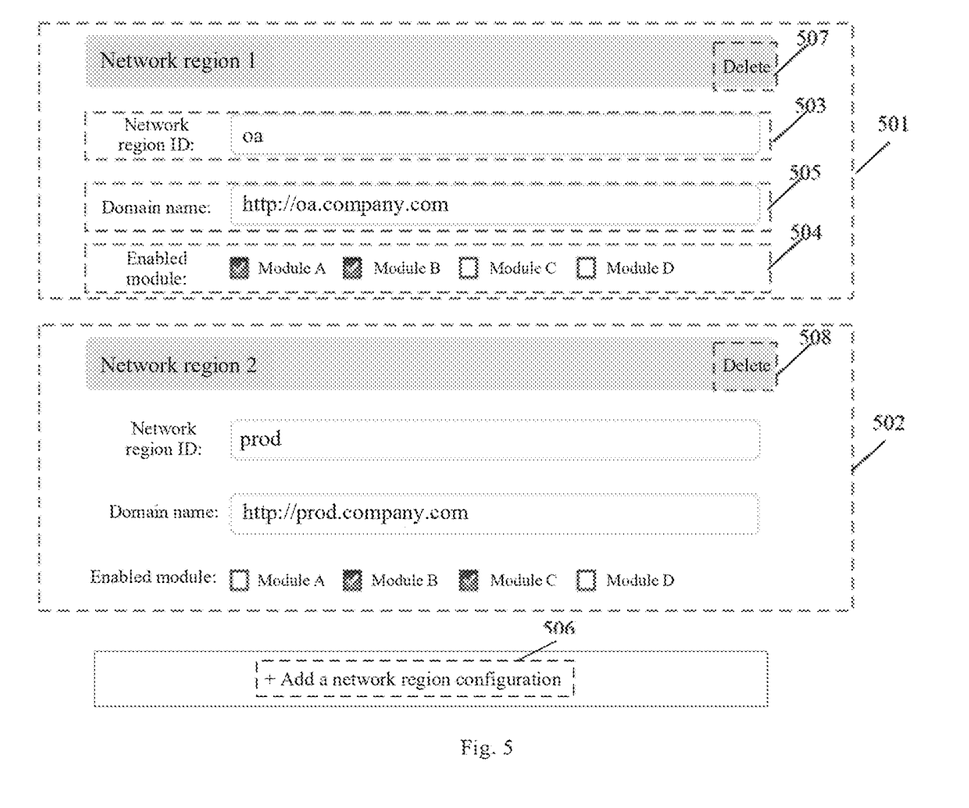
FIG. 5 is a schematic diagram of a target page in the software configuration method according to the present disclosure.

In some optional implementations, the multi-network region configuration module added to the software may also be a module with interface interaction, that is, a correspondence relationship between a network region identifier and a function identifier may be set through a target page. The target page usually includes at least one correspondence relationship filling region, and each correspondence relationship filling region includes a network region identifier filling region and a corresponding function module selection region. As shown in FIG. 5, FIG. 5 is a schematic diagram of a target page in the software configuration method according to this embodiment. The target page shown in FIG. 5 includes two correspondence relationship filling regions, as shown in the icon 501 and icon 502. In the correspondence relationship filling region shown in the icon 501, the network region identifier filling region is shown in the icon 503, and the function module selection region is shown in the icon 504. Here, the user can click a selection boxes before the module A to the module D. When a selection box is selected, it indicates that the function is enabled.

It should be noted that the function module switch shown in the icon 504 is only one form of access control, and may also be a function point switch, a data permission control switch, or the like, which needs to be set according to an actual task.

In some optional implementations, in a web application, when the correspondence relationship between the network region identifier and the function identifier is set in the target page, each correspondence relationship filling region in the target page may further include a domain name filling region, as shown in the icon 505 in FIG. 5. In this case, the correspondence relationship filling region shown in the icon 501 represents that a network region ID is oa, a domain name of the network region is oa.company.com, and when the software system is accessed through the domain name, the function module A and the function module B are available, and the function module C and the function module D are unavailable.

In some optional implementations, the target page may include an addition icon, and the addition icon may be used to add a correspondence relationship between a network region identifier and a function identifier. An icon 506 "+Add a network region configuration" in FIG. 5 shows the addition icon. By clicking the addition icon, the user can add a network region 3 to configure a correspondence relationship between a network region identifier and a function identifier.

In some optional implementations, the target page may include a deletion icon, and the deletion icon may be used to delete the correspondence relationship between a network region identifier and a function identifier. The icon 507 and icon 508 in FIG. 5 show the deletion icon. By clicking the deletion icon shown in the icon 507, the user can delete a correspondence relationship between the network region ID: oa in the network region 1 and enabled function modules "module A" and "module B". By clicking the deletion icon shown in the icon 508, the user can delete a correspondence relationship between the network region ID: prod in the network region 2 and enabled function modules "module B" and "module C".

Figure 6:
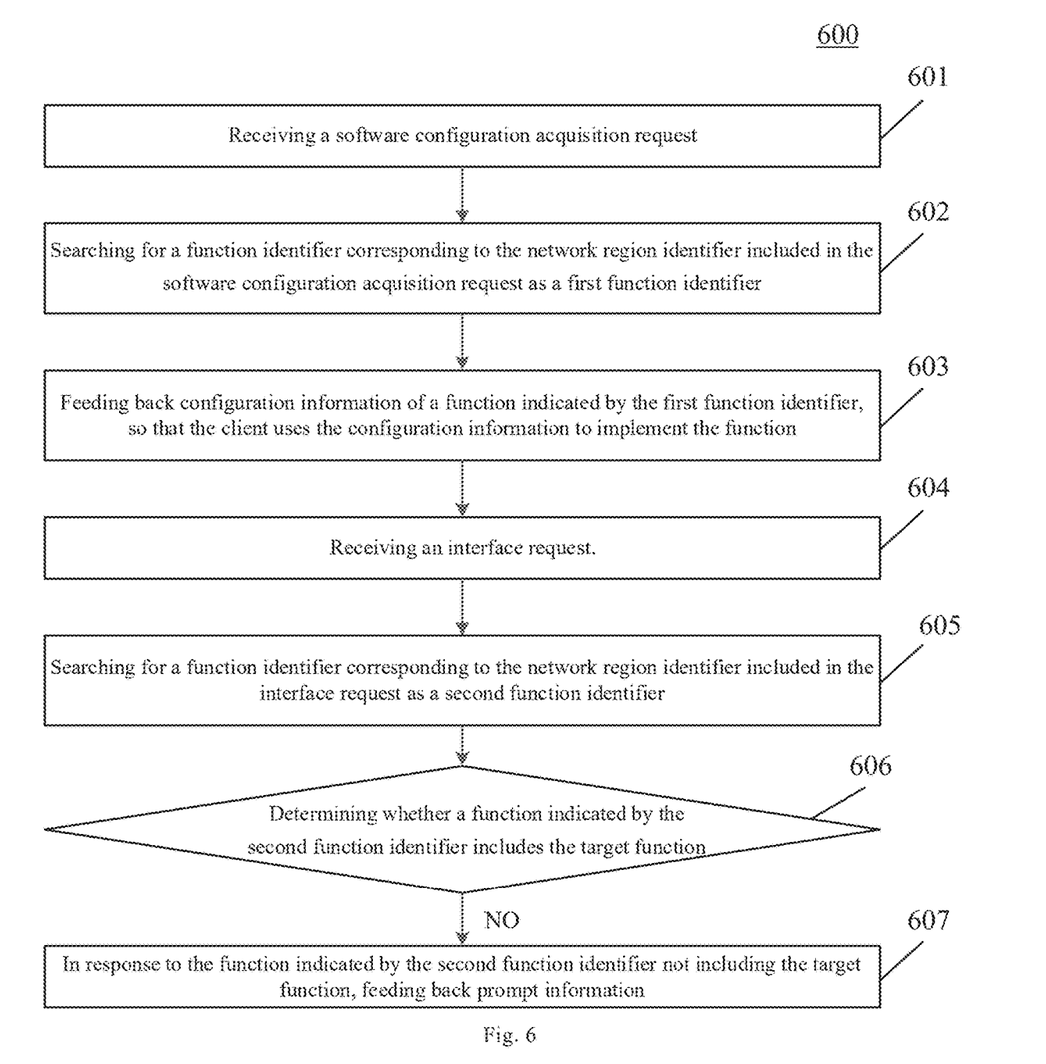
FIG. 6 is a flowchart of another embodiment of the software configuration method according to the present disclosure.

With reference to FIG. 6, a process 600 of another embodiment of the software configuration method is shown. The process 600 of the software configuration method includes the following steps.

Step 601: receiving a software configuration acquisition request.

Step 602: searching for a function identifier corresponding to the network region identifier included in the software configuration acquisition request as a first function identifier.

Step 603: feeding back configuration information of a function indicated by the first function identifier, so that the client uses the configuration information to implement the function.

In this embodiment, the step 601 to the step 603 may be performed in a similar manner to the step 101 to the step 103, and details are not described herein again.

Step 604: receiving an interface request.

In this embodiment, an execution subject of the software configuration method may receive an interface request. The interface request usually includes a network region identifier, and the interface request is usually used to request configuration information of a target function. The target function usually refers to a function that the user wants to use. In some cases, the user may open a function module that is not supported in the current network region through an illegal means. In this case, the client sends the interface request to the execution subject to request the configuration information of the unsupported function module.

Step 605: searching for a function identifier corresponding to the network region identifier included in the interface request as a second function identifier.

In this embodiment, since the interface request includes the network region identifier, the execution subject may search for a function identifier corresponding to the network region identifier included in the interface request as a second function identifier. The execution subject usually includes a correspondence relationship table of a correspondence relationship between the network region identifier and the function identifier. The execution subject may search for, in the correspondence relationship table, the function identifier corresponding to the network region identifier included in the interface request.

Step 606: determining whether a function indicated by the second function identifier includes the target function.

In this embodiment, the execution subject may determine whether the function indicated by the second function identifier includes the target function, so as to determine whether the target function is allowed to be used in the current network region. In response to the function indicated by the second function identifier not including the target function, the step 607 may be performed.

For example, in response to the function indicated by the second function identifier including a function 1 and a function 2, and the target function is a function 3, it may be determined that the function allowed to be used in the current network region do not include the function 3 that the user wants to use.

Step 607: in response to the function indicated by the second function identifier not including the target function, feeding back prompt information.

In this embodiment, when it is determined in step 606 that the function indicated by the second function identifier does not include the target function, the execution subject may feed back the prompt information, so as to reject the user's request for using the target function. The prompt information may also be referred to as an error response. The prompt information is usually used to indicate that the target function is not allowed to be used.

It can be seen from FIG. 6 that compared with the embodiment corresponding to FIG. 1, the process 600 of the software configuration method in this embodiment reflects the steps of searching for whether a function allowed to be used in the current network region includes the target function after receiving the interface request for requesting the configuration information of the target function, and in response to not including the target function, feeding back the prompt information, which indicates that the target function is not allowed to be used. Therefore, the solution described in this embodiment may return the prompt information when the user wants to use a function module that is not supported in the current network region, thereby rejecting the user's request.

In some optional implementations, in a process of sending the interface request to a server cluster that provides a service for the software, the interface request passes through a gateway device, and the gateway device adds a network region identifier to the interface request sent by the client.

Figure 7:
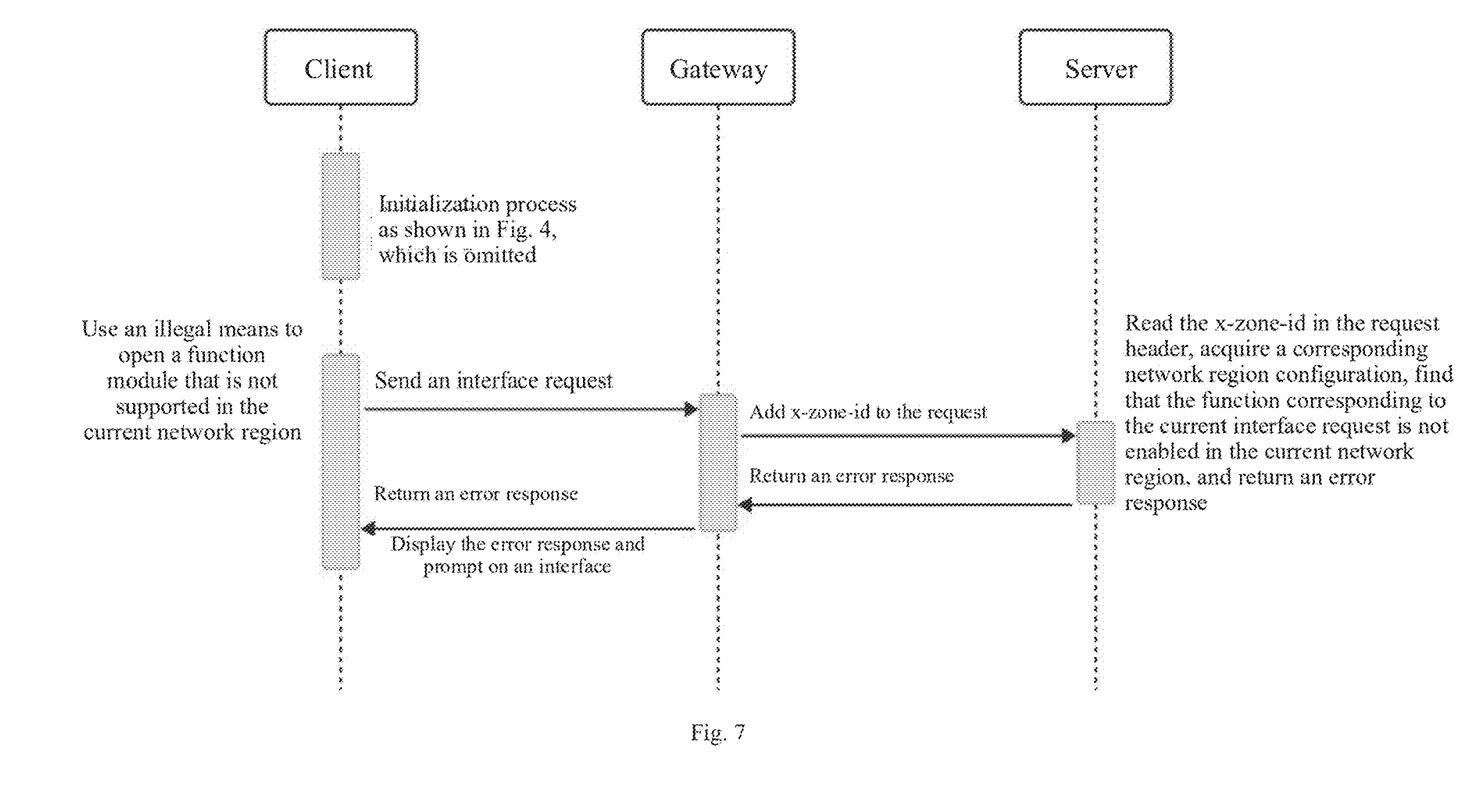
FIG. 7 is a sequence diagram of another embodiment of the software configuration method according to the present disclosure.

With reference to FIG. 7, FIG. 7 is a sequence diagram of another embodiment of the software configuration method according to this embodiment. In FIG. 7, the client first performs a software initialization process, which is omitted as shown in FIG. 4. After the initialization process ends, in response to the user using an illegal means to open a function module that is not supported in the current network region, the client sends an interface request to a server, and the interface request is used to request configuration information of the unsupported function. When the interface request passes through a gateway, a network region identifier x-zone-id of a current network region is added to the interface request. After receiving the interface request, the server reads the x-zone-id in an interface request header, and obtains configuration information of a function corresponding to the current network region, and finds that the function corresponding to the current interface request is not enabled in the current network region, and therefore returns an error response, and returns the error response to the client through the gateway. The client displays the error response and prompt information on an interface.

Figure 8:
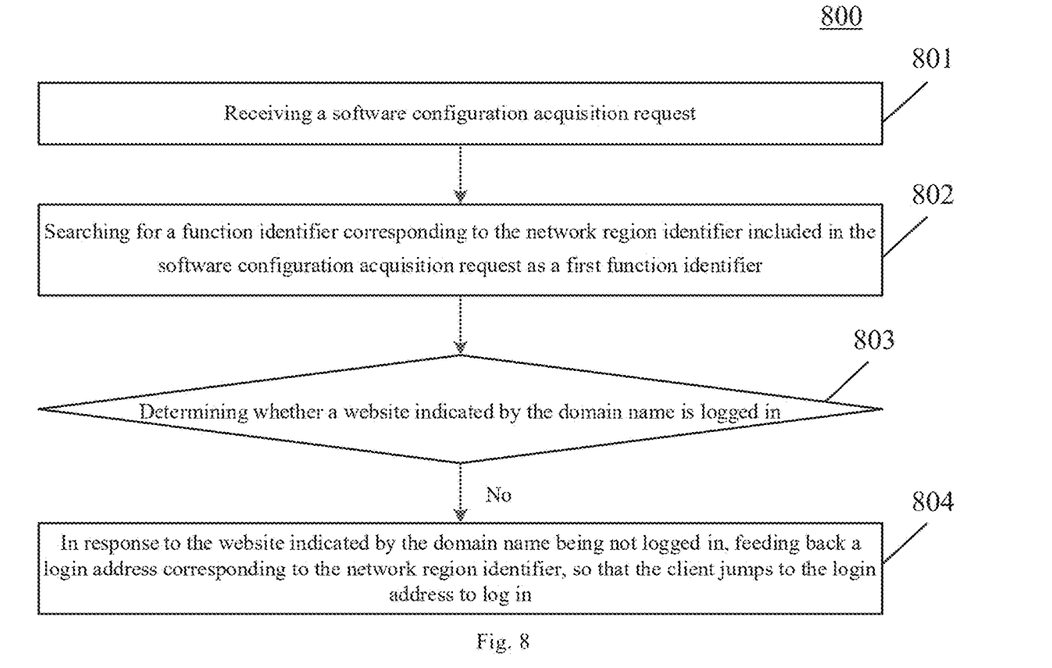
FIG. 8 is a flowchart of another embodiment of the software configuration method according to the present disclosure.

With further reference to FIG. 8, a process 800 of another embodiment of the software configuration method is shown. The process 800 of the software configuration method includes the following steps.

Step 801: receiving a software configuration acquisition request.

In this embodiment, an execution subject of the software configuration method may receive a software configuration acquisition request. The execution subject is usually a server, and the software configuration acquisition request usually originates from a client. That is, when the client uses the software, the client sends the software configuration acquisition request to a software server. The software configuration acquisition request is usually used to request configuration information of a function that is allowed to be used.

Here, the software configuration acquisition request may include a network region identifier. The network region identifier usually indicates a network region to which the client from which the software configuration acquisition request originates belongs, that is, the network region where the execution subject is currently located. The network region identifier is used to identify a source of a network request in a subsequent service and perform corresponding function control. The network region identifier may include two parts, i.e., a name and a value. The name part cannot be repeated with the name of an HTTP (Hypertext Transfer Protocol) header that has been occupied in the system, the value part is used to mark each network region, and different network region identifiers cannot be repeated.

For example, a network region identifier of an office network may be: x-zone-id: oa, where x-zone-id is the header name and oa is the value.

It should be noted that the client may send the software configuration acquisition request to the software server when the software is started.

Here, in response to the software accessed by the user being a web application, the software configuration acquisition request usually includes a domain name. The domain name, also known as a domain, is a name of a computer or a computer group on the Internet, includes a string of names separated by dots, and is used as a locating identifier (sometimes also refers to a geographic location) for a computer during data transmission. When a web application supports access control in a plurality of network regions, it is common that different network regions use different domain names. Here, the domain name is associated with the network region identifier, and each network region may be associated with one or more domain names.

Step 802: searching for a function identifier corresponding to the network region identifier included in the software configuration acquisition request as a first function identifier.

In this embodiment, the step 802 may be performed in a similar manner to the step 102, and details are not described herein again.

Step 803: determining whether a website indicated by the domain name is logged in.

In this embodiment, the execution subject may determine whether the client logs in the website indicated by the domain name. If not, the step 804 may be performed.

Step 804: in response to the website indicated by the domain name being not logged in, feeding back a login address corresponding to the network region identifier, so that the client jumps to the login address to log in.

In this embodiment, when it is determined in step 803 that the website indicated by the domain name is not logged in, the execution subject may feed back a login address corresponding to the network region identifier, so that the client that originates the software configuration acquisition request jumps to the login address to log in. In this way, when accessing the same website in different network regions, domain names may be repeated and do not need to be unique, which does not affect the correctness of a function logic, because the server only identifies a source of the request from the network region identifier.

It can be seen from FIG. 8 that, compared with the embodiment corresponding to FIG. 1, the process 800 of the software configuration method in this embodiment reflects the step of feeding back a login address corresponding to the network region identifier when the client is not logged in, so that the client jumps to the login address to log in. Therefore, the solution described in this embodiment may support the capability of multi-domain names for a web application, so that the same website does not need to be unique for different network regions.

Figure 9:
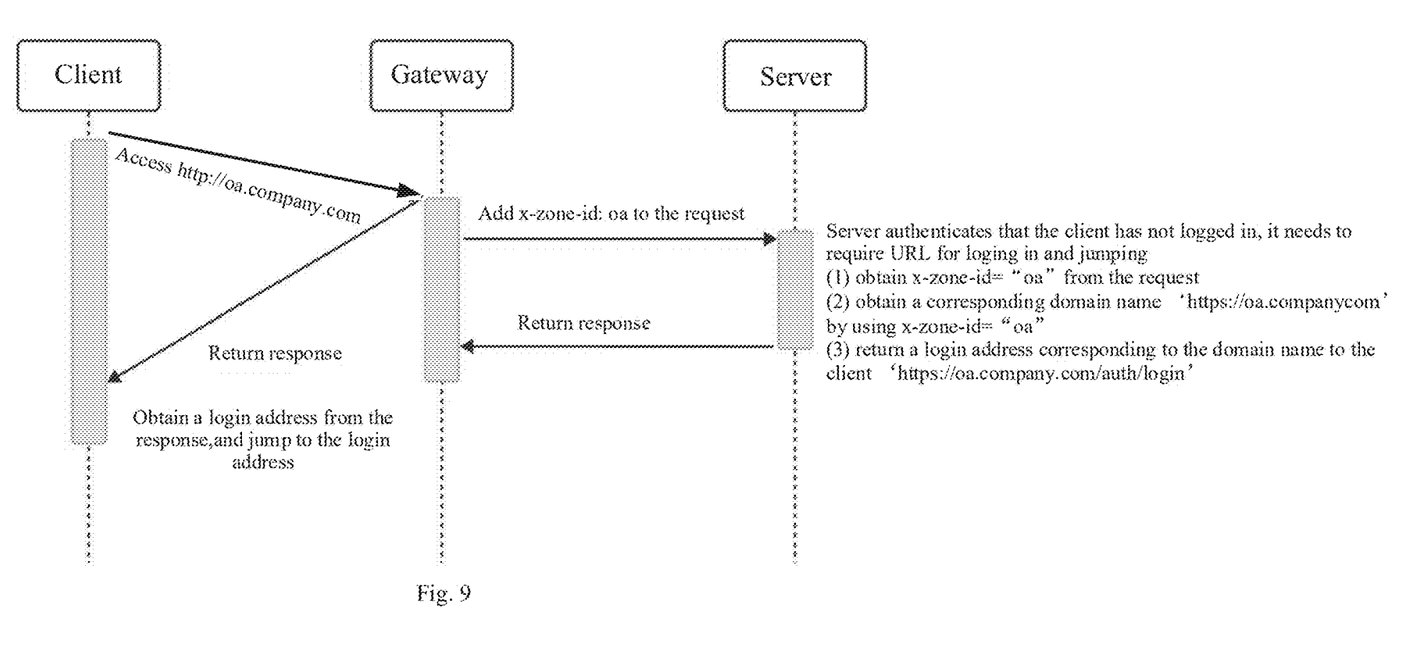
FIG. 9 is a sequence diagram of another embodiment of the software configuration method according to the present disclosure.

With reference to FIG. 9, FIG. 9 is a sequence diagram of another embodiment of the software configuration method according to this embodiment. In FIG. 9, after accessing https://oa.companycom, the client sends a domain name access request to a server. When the request passes through a gateway, a network region identifier x-zone-id: oa of a current network region is added to the request. After receiving the domain name access request, the server authenticates whether the client has logged in. When it is determined that the client has not logged in, the server reads x-zone-id='oa' in a software configuration acquisition request header, obtains a corresponding domain name 'https://oa.company-com' by using x-zone-id='oa', and returns a login address corresponding to the domain name to the client https://oa.company.com/auth/login, and returns a response to the client. After receiving the response, the client obtains the login address from the response and jumps to the login address.

Figure 10:
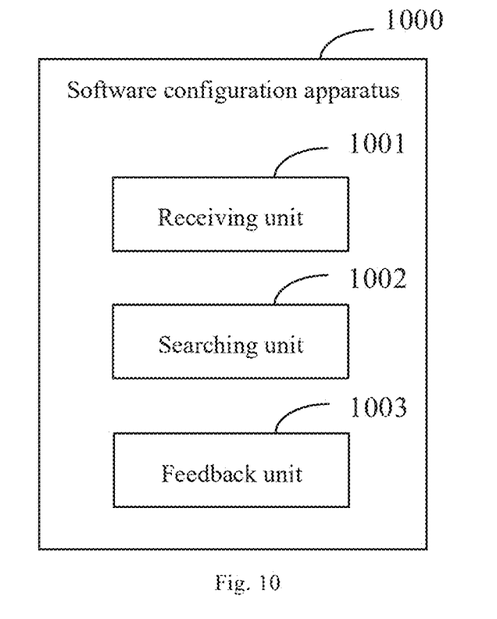
FIG. 10 is a schematic structural diagram of an embodiment of a software configuration apparatus according to the present disclosure.

With further reference to FIG. 10, as an implementation of the method shown in the above figures, the present application provides an embodiment of a software configuration apparatus. This apparatus embodiment corresponds to the method embodiment shown in FIG. 1, and the apparatus may be specifically applied to various electronic devices.

As shown in FIG. 10, the software configuration apparatus 1000 in this embodiment includes: a receiving unit 1001, a searching unit 1002, and a feedback unit 1003. The receiving unit 1001 is configured to receive a software configuration acquisition request, in which the software configuration acquisition request includes a network region identifier, the network region identifier indicates a network region to which a client from which the software configuration acquisition request originates belongs, and the software configuration acquisition request is used to request configuration information of a function that is allowed to be used; the searching unit 1002 is configured to search for a function identifier corresponding to the network region identifier included in the software configuration acquisition request as a first function identifier; and the feedback unit 1003 is configured to feed back configuration information of a function indicated by the first function identifier, so that the client uses the configuration information to implement the function.

In this embodiment, specific processing of the receiving unit 1001, the searching unit 1002 and the feedback unit 1003 of the software configuration apparatus 1000 may refer to the step 101, the step 102, and the step 103 in the embodiment corresponding to FIG. 1.

In some optional implementations, the software configuration apparatus 1000 may further include: a second receiving unit (not shown in the figure), a second searching unit (not shown in the figure), a determining unit (not shown in the figure), and a second feedback unit (not shown in the figure). The second receiving unit is configured to receive an interface request, in which the interface request includes the network region identifier, and the interface request is used to request configuration information of a target function; the second searching unit is configured to search for a function identifier corresponding to the network region identifier included in the interface request as a second function identifier; the determining unit is configured to determine whether a function indicated by the second function identifier includes the target function; and the second feedback unit is configured to feed back prompt information in response to the function indicated by the second function identifier not including the target function, in which the prompt information is used to indicate that the target function is not allowed to be used.

In some optional implementations, the software configuration acquisition request includes a domain name; and the feedback unit 1003 is further configured to feed back configuration information of a function indicated by the first function identifier, so that the client uses the configuration information to implement the function in the following manner: determining whether a website indicated by the domain name is logged in; and in response to the website indicated by the domain name being not logged in, feeding back a login address corresponding to the network region identifier, so that the client jumps to the login address to log in.

In some optional implementations, the network region identifier is added after a gateway receives a target request sent by the client, and the target request includes the software configuration acquisition request and the interface request.

In some optional implementations, a correspondence relationship between the network region identifier and the function identifier is set through a target page, and the target page includes at least one correspondence relationship filling region, and each correspondence relationship filling region includes a network region identifier filling region and a corresponding function module selection region.

In some optional implementations, each correspondence relationship filling region further includes a domain name filling region.

In some optional implementations, the target page includes an addition icon, and the addition icon is used to add the correspondence relationship between the network region identifier and the function identifier.

In some optional implementations, the target page includes a deletion icon, and the deletion icon is used to delete the correspondence relationship between the network region identifier and the function identifier.

Figure 11:
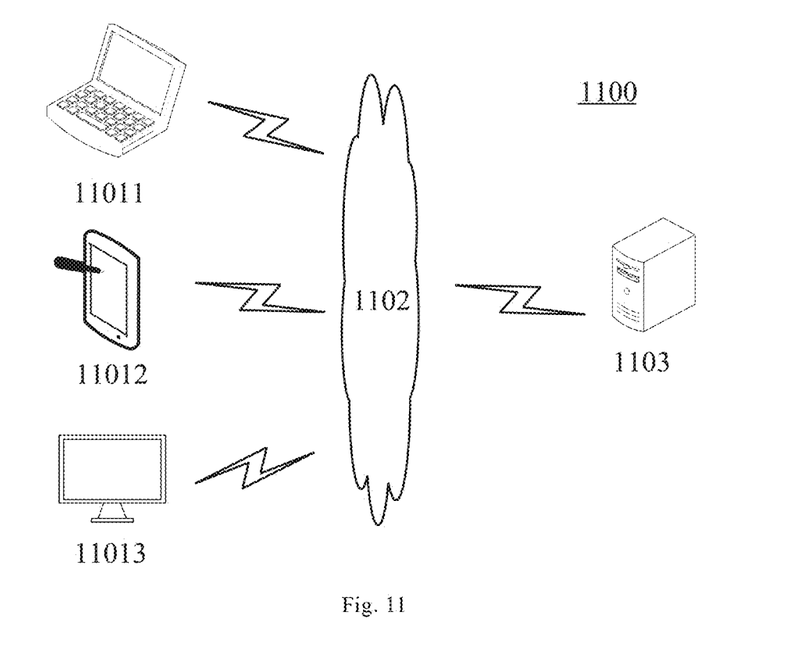
FIG. 11 is a schematic diagram of an exemplary system architecture to which various embodiments of the present disclosure can be applied.

With reference to FIG. 11, FIG. 11 shows an exemplary system architecture 1100 to which an embodiment of the software configuration method of the present disclosure can be applied.

As shown in FIG. 11, the system architecture 1100 may include terminal devices 11011, 11012 and 11013, a network 1102, and a server 1103. The network 1102 is a medium used to provide a communication link between the terminal devices 11011, 11012 and 11013 and the server 1103. The network 1102 may include various connection types, for example, a wired or wireless communication link, an optical fiber cable, or the like.

A user may use the terminal devices 11011, 11012 and 11013 to interact with the server 1103 through the network 1102, to send or receive messages, and the like. For example, the terminal devices 11011, 11012 and 11013 may send a software configuration acquisition request to the server 1103. The terminal devices 11011, 11012 and 11013 may be installed with various communication client applications, for example, an office application, an instant messaging software, or the like.

The terminal devices 11011, 11012 and 11013 may be hardware or software. When the terminal devices 11011, 11012 and 11013 are hardware, they may be various electronic devices with a display screen and supporting information exchange, including but not limited to a smart phone, a tablet computer, a laptop portable computer, or the like. When the terminal devices 11011, 11012 and 11013 are software, they may be installed in the foregoing listed electronic devices. The terminal devices may be implemented as a plurality of software or software modules (for example, a plurality of software or software modules used to provide a distributed service), or may be implemented as a single software or software module. This is not specifically limited here.

The server 1103 may be a server providing various services. For example, it may be a background server for analyzing the software configuration acquisition request. The server 1103 may first receive a software configuration acquisition request including a network region identifier and sent by the terminal devices 11011, 11012 and 11013; then search for a function identifier corresponding to the network region identifier included in the software configuration acquisition request as a first function identifier; and then feed back configuration information of a function indicated by the first function identifier to the terminal devices 11011, 11012 and 11013, so that the terminal devices 11011, 11012 and 11013 use the configuration information to implement the function indicated by the first function identifier.

It should be noted that the server 1103 may be hardware or software. When the server 1103 is hardware, it may be implemented as a distributed server cluster composed of a plurality of servers, or may be implemented as a single server. When the server 1103 is software, it may be implemented as a plurality of software or software modules (for example, used to provide a distributed service), or may be implemented as a single software or software module. This is not specifically limited here.

It should also be noted that the software configuration method provided in the embodiments of the present disclosure is usually performed by the server 1103, and the software configuration apparatus is usually disposed in the server 1103.

It should be understood that the numbers of terminal devices, networks, and servers in FIG. 11 are merely illustrative. According to implementation requirements, there may be any number of terminal devices, networks, and servers.

Figure 12:
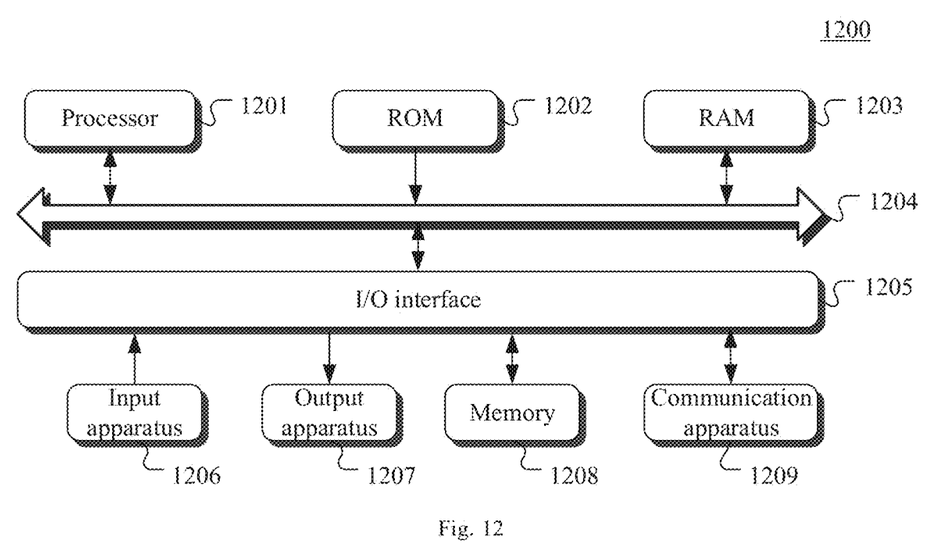
FIG. 12 is a schematic structural diagram of a computer system of an electronic device suitable for implementing the embodiments of the present disclosure.

With reference to FIG. 12 below, a schematic structural diagram of an electronic device (for example, a server in FIG. 11) 1200 suitable for implementing the embodiments of the present disclosure is shown. The electronic device shown in FIG. 12 is merely an example, and shall not impose any limitation on the function and scope of use of the embodiments of the present disclosure.

As shown in FIG. 12, the electronic device 1200 may include a processor (for example, a central processor, a graphics processor, etc.) 1201 that may perform various appropriate actions and processing in accordance with a program stored in a read-only memory (ROM) 1202 or a program loaded from a memory 1208 into a random access memory (RAM) 1203. The RAM 1203 further stores various programs and data required for the operation of the electronic device 1200. The processor 1201, the ROM 1202, and the RAM 1203 are connected to each other through a bus 1204. An input/output (I/O) interface 1205 is also connected to the bus 1204.

Generally, the following apparatuses may be connected to the I/O interface 1205: an input apparatus 1206 including, for example, a touch screen, a touchpad, a keyboard, a mouse, a camera, a microphone, an accelerometer, and a gyroscope; an output apparatus 1207 including, for example, a liquid crystal display (LCD), a speaker, and a vibrator; the memory 1208 including, for example, a tape and a hard disk; and a communication apparatus 1209. The communication apparatus 1209 may allow the electronic device 1200 to perform wireless or wired communication with other devices to exchange data. Although FIG. 12 shows the electronic device 1200 having various apparatuses, it should be understood that it is not required to implement or have all of the shown apparatuses. It may be an alternative to implement or have more or fewer apparatuses. Each block shown in FIG. 12 may represent one apparatus, or may represent a plurality of apparatuses as required.

In particular, according to an embodiment of the present disclosure, the process described above with reference to the flowcharts may be implemented as a computer software program. For example, this embodiment of the present disclosure includes a computer program product, which includes a computer program carried on a computer-readable medium, where the computer program includes program code for performing the method shown in the flowchart. In such an embodiment, the computer program may be downloaded from a network through the communication apparatus 1209 and installed, installed from the memory 1208, or installed from the ROM 1202. When the computer program is executed by the processor 1201, the above functions defined in the method of the embodiment of the present disclosure are performed. It should be noted that the computer-readable medium described in the embodiment of the present disclosure may be a computer-readable signal medium, a computer-readable storage medium, or any combination thereof. The computer-readable storage medium may be, for example but not limited to, electric, magnetic, optical, electromagnetic, infrared, or semiconductor systems, apparatuses, or devices, or any combination thereof. A more specific example of the computer-readable storage medium may include, but is not limited to: an electrical connection having one or more wires, a portable computer magnetic disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the embodiment of the present disclosure, the computer-readable storage medium may be any tangible medium including or storing a program which may be used by or in combination with an instruction execution system, apparatus, or device. In the embodiment of the present disclosure, the computer-readable signal medium may include a data signal propagated in a baseband or as a part of a carrier, where the data signal carries computer-readable program code. The propagated data signal may be in various forms, including but not limited to an electromagnetic signal, an optical signal, or any suitable combination thereof. The computer-readable signal medium may also be any computer-readable medium other than the computer-readable storage medium. The computer-readable signal medium can send, propagate, or transmit a program used by or in combination with an instruction execution system, apparatus, or device. The program code included in the computer-readable medium may be transmitted by any suitable medium, including but not limited to: electric wires, optical cables, radio frequency (RF), etc., or any suitable combination thereof.

The foregoing computer-readable medium may be included in the foregoing electronic device; or may exist independently, without being assembled into the electronic device. The foregoing computer-readable medium carries one or more programs, and when the one or more programs are executed by the electronic device, the electronic device is enabled to: receive a software configuration acquisition request, in which the software configuration acquisition request includes a network region identifier, the network region identifier indicates a network region to which a client from which the software configuration acquisition request originates belongs, and the software configuration acquisition request is used to request configuration information of a function that is allowed to be used; search for a function identifier corresponding to the network region identifier included in the software configuration acquisition request as a first function identifier; and feed back configuration information of a function indicated by the first function identifier, so that the client uses the configuration information to implement the function indicated by the first function identifier.

The computer program code for performing the operations in the embodiments of the present disclosure may be written in one or more programming languages or a combination thereof, where the programming languages include object-oriented programming languages, such as Java, Smalltalk, and C++, and further include conventional procedural programming languages, such as "C" language or similar programming languages. The program code may be completely executed on a computer of a user, partially executed on a computer of a user, executed as an independent software package, partially executed on a computer of a user and partially executed on a remote computer, or completely executed on a remote computer or server. In the circumstance involving the remote computer, the remote computer may be connected to the computer of the user over any type of network, including a local area network (LAN) or a wide area network (WAN), or may be connected to an external computer (for example, connected over the Internet using an Internet service provider).

The flowcharts and block diagrams in the drawings illustrate the possibly implemented architecture, functions, and operations of the system, method, and computer program product according to various embodiments of the present disclosure. In this regard, each block in the flowchart or block diagram may represent a module, program segment, or part of code, and the module, program segment, or part of code includes one or more executable instructions for implementing the specified logical functions. It should also be noted that, in some alternative implementations, the functions marked in the blocks may also occur in an order different from that marked in the drawings. For example, two blocks shown in succession can actually be executed substantially in parallel, or they can sometimes be executed in the reverse order, depending on the functions involved. It should also be noted that each block in the block diagram and/or the flowchart, and a combination of the blocks in the block diagram and/or the flowchart can be implemented by a dedicated hardware-based system that executes specified functions or operations, or can be implemented by a combination of dedicated hardware and computer instructions.

The units involved in the embodiments described in the present disclosure may be implemented by means of software, or may be implemented by means of hardware. The described units may also be provided in a processor. For example, it may be described as: a processor including a receiving unit, a searching unit, and a feedback unit. The names of these units do not constitute a limitation on the unit itself in some cases. For example, the receiving unit may also be described as "a unit for receiving a software configuration acquisition request".

The above descriptions are only preferred embodiments of the present disclosure and explanations of the applied technical principles. Those skilled in the art should understand that the scope of the invention involved in the embodiments of the present disclosure is not limited to the technical solutions formed by a specific combination of the above technical features, and should also cover other technical solutions formed by any combination of the above technical features or their equivalent features without departing from the above inventive concept. For example, a technical solution formed by replacing the above features with technical features with similar functions disclosed in the embodiments of the present disclosure (but not limited thereto).

The invention claimed is:

1. A software configuration method, comprising:
receiving a software configuration acquisition request, wherein the software configuration acquisition request comprises a network region identifier, the network region identifier indicates a network region to which a client from which the software configuration acquisition request originates belongs, and the software configuration acquisition request is used to request configuration information of a function that is allowed to be used;
searching for a function identifier corresponding to the network region identifier comprised in the software configuration acquisition request as a first function identifier; and
feeding back configuration information of a function indicated by the first function identifier, so that the client uses the configuration information to implement the function indicated by the first function identifier,
wherein a correspondence relationship between the network region identifier and the function identifier is set through a target page, and the target page comprises at least one correspondence relationship filling region, and each correspondence relationship filling region comprises a network region identifier filling region and a corresponding function module selection region.

2. The method according to claim 1, further comprising:
receiving an interface request, wherein the interface request comprises the network region identifier, and the interface request is used to request configuration information of a target function;
searching for a function identifier corresponding to the network region identifier comprised in the interface request as a second function identifier;
determining whether a function indicated by the second function identifier comprises the target function; and
in response to the function indicated by the second function identifier not comprising the target function, feeding back prompt information, wherein the prompt information is used to indicate that the target function is not allowed to be used.

3. The method according to claim 1, wherein the software configuration acquisition request comprises a domain name; and
the feeding back configuration information of a function indicated by the first function identifier, so that the client uses the configuration information to implement the function indicated by the first function identifier, comprises:
determining whether a website indicated by the domain name is logged in; and
in response to the website indicated by the domain name being not logged in, feeding back a login address corresponding to the network region identifier, so that the client jumps to the login address to log in.

4. The method according to claim 2, wherein the network region identifier is added after a gateway receives a target request sent by the client, and the target request comprises the software configuration acquisition request and the interface request.

5. The method according to claim 1, wherein the each correspondence relationship filling region further comprises a domain name filling region.

6. The method according to claim 1, wherein the target page comprises an addition icon, and the addition icon is used to add the correspondence relationship between the network region identifier and the function identifier.

7. The method according to claim 1, wherein the target page comprises a deletion icon, and the deletion icon is used to delete the correspondence relationship between the network region identifier and the function identifier.

8. An electronic device, comprising:
one or more processors; and
a memory, configured to store one or more programs,
wherein when the one or more programs are executed by the one or more processors, the one or more processors is caused to implement a software configuration method, and the method comprises:
receiving a software configuration acquisition request, wherein the software configuration acquisition request comprises a network region identifier, the network region identifier indicates a network region to which a client from which the software configuration acquisition request originates belongs, and the software configuration acquisition request is used to request configuration information of a function that is allowed to be used;
searching for a function identifier corresponding to the network region identifier comprised in the software configuration acquisition request as a first function identifier; and
feeding back configuration information of a function indicated by the first function identifier, so that the client uses the configuration information to implement the function indicated by the first function identifier,
wherein a correspondence relationship between the network region identifier and the function identifier is set through a target page, and the target page comprises at least one correspondence relationship filling region, and each correspondence relationship filling region comprises a network region identifier filling region and a corresponding function module selection region.

9. The electronic device according to claim 8, wherein the method further comprises:
receiving an interface request, wherein the interface request comprises the network region identifier, and the interface request is used to request configuration information of a target function;
searching for a function identifier corresponding to the network region identifier comprised in the interface request as a second function identifier;
determining whether a function indicated by the second function identifier comprises the target function; and
in response to the function indicated by the second function identifier not comprising the target function, feeding back prompt information, wherein the prompt information is used to indicate that the target function is not allowed to be used.

10. The electronic device according to claim 8, wherein the software configuration acquisition request comprises a domain name; and
the feeding back configuration information of a function indicated by the first function identifier, so that the client uses the configuration information to implement the function indicated by the first function identifier, comprises:

determining whether a website indicated by the domain name is logged in; and in response to the website indicated by the domain name being not logged in, feeding back a login address corresponding to the network region identifier, so that the client jumps to the login address to log in.

11. The electronic device according to claim 9, wherein the network region identifier is added after a gateway receives a target request sent by the client, and the target request comprises the software configuration acquisition request and the interface request.

12. The electronic device according to claim 8, wherein the each correspondence relationship filling region further comprises a domain name filling region.

13. The electronic device according to claim 8, wherein the target page comprises an addition icon, and the addition icon is used to add the correspondence relationship between the network region identifier and the function identifier.

14. The electronic device according to claim 8, wherein the target page comprises a deletion icon, and the deletion icon is used to delete the correspondence relationship between the network region identifier and the function identifier.

15. A non-transitory computer-readable medium, wherein a computer program is stored on the non-transitory computer-readable medium, when the computer program is executed by a processor, the processor is caused to implement a software configuration method, and the method comprises:

receiving a software configuration acquisition request, wherein the software configuration acquisition request comprises a network region identifier, the network region identifier indicates a network region to which a client from which the software configuration acquisition request originates belongs, and the software configuration acquisition request is used to request configuration information of a function that is allowed to be used;

searching for a function identifier corresponding to the network region identifier comprised in the software configuration acquisition request as a first function identifier; and feeding back configuration information of a function indicated by the first function identifier, so that the client uses the configuration information to implement the function indicated by the first function identifier, wherein a correspondence relationship between the network region identifier and the function identifier is set through a target page, and the target page comprises at least one correspondence relationship filling region, and each correspondence relationship filling region comprises a network region identifier filling region and a corresponding function module selection region.

16. The non-transitory computer-readable medium according to claim 15, wherein the method further comprises:

receiving an interface request, wherein the interface request comprises the network region identifier, and the interface request is used to request configuration information of a target function;

searching for a function identifier corresponding to the network region identifier comprised in the interface request as a second function identifier;

determining whether a function indicated by the second function identifier comprises the target function; and in response to the function indicated by the second function identifier not comprising the target function, feeding back prompt information, wherein the prompt information is used to indicate that the target function is not allowed to be used.

17. The non-transitory computer-readable medium according to claim 15, wherein the software configuration acquisition request comprises a domain name; and the feeding back configuration information of a function indicated by the first function identifier, so that the client uses the configuration information to implement the function indicated by the first function identifier, comprises:

determining whether a website indicated by the domain name is logged in; and in response to the website indicated by the domain name being not logged in, feeding back a login address corresponding to the network region identifier, so that the client jumps to the login address to log in.

18. The non-transitory computer-readable medium according to claim 15, wherein the each correspondence relationship filling region further comprises a domain name filling region.

* * * * *